(12) United States Patent
Omeri

(10) Patent No.: US 9,046,442 B2
(45) Date of Patent: Jun. 2, 2015

(54) METHOD AND APPARATUS FOR OPERATING AN INJECTION VALVE

(75) Inventor: Marco Omeri, Viareggio (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 28 days.

(21) Appl. No.: 13/885,955

(22) PCT Filed: Nov. 2, 2011

(86) PCT No.: PCT/EP2011/069207
§ 371 (c)(1),
(2), (4) Date: Aug. 26, 2013

(87) PCT Pub. No.: WO2012/065843
PCT Pub. Date: May 24, 2012

(65) Prior Publication Data
US 2013/0327132 A1    Dec. 12, 2013

(30) Foreign Application Priority Data
Nov. 17, 2010    (EP) .................................... 10191509

(51) Int. Cl.
*G01M 15/02* (2006.01)
*F02D 41/20* (2006.01)
*F02M 65/00* (2006.01)
*F02M 59/36* (2006.01)
*F02D 41/14* (2006.01)

(52) U.S. Cl.
CPC ............. *G01M 15/02* (2013.01); *F02M 65/005* (2013.01); *F02M 59/366* (2013.01); *F02D 41/20* (2013.01); *F02D 2041/1432* (2013.01); *F02D 2041/2055* (2013.01)

(58) Field of Classification Search
CPC ................ F02D 2041/2055; F02D 2041/1432; F02M 59/366; F02M 65/005
USPC .......................................... 73/114.45, 114.49
See application file for complete search history.

(56) References Cited

U.S. PATENT DOCUMENTS 5,433,109 A * 7/1995 Mayer-Dick et al. ....... 73/114.49
5,747,684 A * 5/1998 Pace et al. .................. 73/114.49
(Continued)

FOREIGN PATENT DOCUMENTS

DE     102009002483 A1   10/2010    ............. F02D 41/20
WO        94/13991 A1     6/1994    ............. F02D 41/20
WO      2012/065843 A1    5/2012    ............. F02D 41/20

OTHER PUBLICATIONS

International Search Report and Written Opinion, Application No. PCT/EP2011/069207, 9 pages, Dec. 9, 2011.

*Primary Examiner* — Freddie Kirkland, III
(74) *Attorney, Agent, or Firm* — King & Spalding L.L.P.

(57) ABSTRACT

An injection valve includes a valve needle preventing a fluid flow out of an injection nozzle in a closing position and enabling the fluid flow of the injection nozzle apart from the closing position. Furthermore the injection valve includes an electro-magnetic actuator unit being designed to actuate the valve needle. The actuator unit is activated according to a predetermined activation signal with a given activation period for effecting a fluid flow out of the injection nozzle. An actuator unit voltage characteristic is captured at least over a period of time during which the valve needle could reach the closing position. A noise part of the actuator unit voltage characteristic is determined and a closing time representing a time when the valve needle reaches the closing position is determined depending on the noise part of the captured actuator voltage characteristic.

12 Claims, 3 Drawing Sheets

(56) References Cited

U.S. PATENT DOCUMENTS

| | | | | |
|---|---|---|---|---|
| 5,995,356 | A | * | 11/1999 | Glavmo et al. ............... 361/154 |
| 6,848,626 | B2 | * | 2/2005 | McCoy et al. .................... 239/5 |
| 6,949,923 | B2 | * | 9/2005 | Schultz et al. ........... 324/207.18 |
| 2002/0130192 | A1 | | 9/2002 | Mccoy et al. .................... 239/5 |
| 2003/0071613 | A1 | | 4/2003 | Schultz et al. ........... 324/207.16 |
| 2007/0067127 | A1 | * | 3/2007 | Bolz ............................... 702/94 |
| 2008/0148831 | A1 | * | 6/2008 | Kekedjian et al. ......... 73/116.01 |
| 2012/0101707 | A1 | | 4/2012 | Kemmer et al. .............. 701/103 |

* cited by examiner

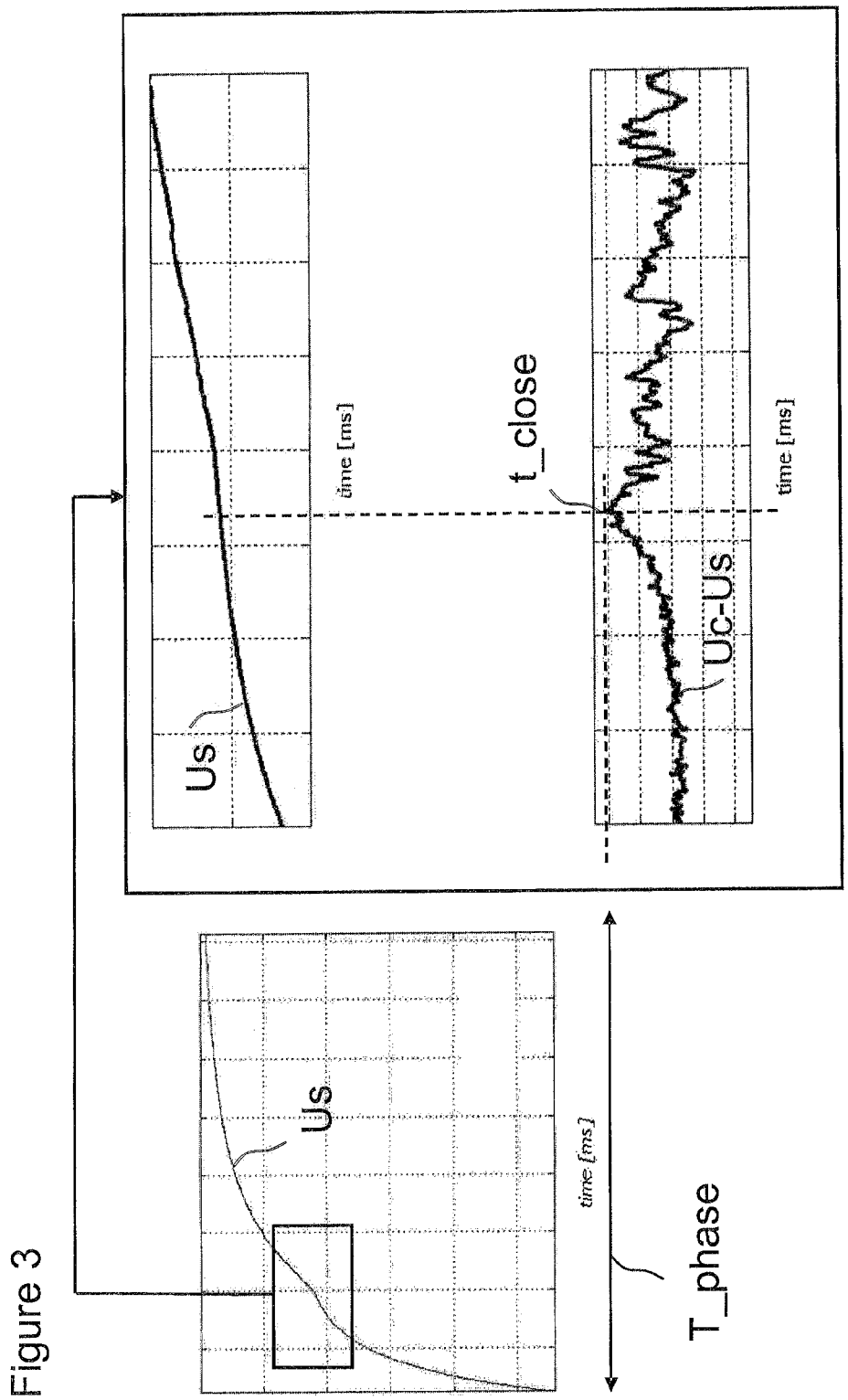

METHOD AND APPARATUS FOR OPERATING AN INJECTION VALVE

CROSS-REFERENCE TO RELATED APPLICATIONS

This application is a U.S. National Stage Application of International Application No. PCT/EP2011/069207 filed Nov. 2, 2011, which designates the United States of America, and claims priority to EP Application No. 10191509.8 filed Nov. 17, 2010, the contents of which are hereby incorporated by reference in their entirety.

TECHNICAL FIELD

This disclosure relates to a method and an apparatus for operating an injection valve.

BACKGROUND

Increasingly stringent rules concerning the admissibility of noxious emissions from internal combustion engines which are arranged in vehicles render it necessary to take various measures which reduce the emission. One way to reduce these emissions is to improve the combustion process in the internal combustion engine. Injection valves are in wide spread use, in particular for internal combustion engines where they may be arranged in order to dose fluid into an intake manifold of the internal combustion engine or directly into the combustion chamber of a cylinder of the internal combustion engine.

SUMMARY

One embodiment provides a method to operate an injection valve comprising: a valve needle preventing a fluid flow out of an injection nozzle in a closing position and enabling the fluid flow of the injection nozzle apart from the closing position, and an electro-magnetic actuator unit being designed to actuate the valve needle, wherein the actuator unit is activated according to a predetermined activation signal with a given activation period for effecting a fluid flow out of the injection nozzle, an actuator unit voltage characteristic is captured at least over a period of time during which the valve needle could reach the closing position, a noise part of the actuator unit voltage characteristic is determined and a closing time representing a time when the valve needle reaches the closing position is determined depending on the noise part of the captured actuator voltage characteristic.

In a further embodiment, a smoothed actuator unit voltage characteristic is determined by at least filtering the actuator unit voltage characteristic once with a smoothing filter and the noise part is determined depending on the difference between the captured actuator unit voltage characteristic and the smoothed actuator unit voltage characteristic.

In a further embodiment, the closing time is determined in correlation with a maximum of the noise part.

In a further embodiment, the smoothing filter is designed to determine for a respective value of the captured actuator unit voltage characteristic or a pre-processed actuator unit voltage characteristic an average value or a weighted average value depending on the value itself and a given second number of previous and subsequent values.

In a further embodiment, depending on the actuator unit voltage characteristic and/or how it is captured a first number of filter cycles is defined.

In a further embodiment, depending on the captured actuator unit voltage characteristic and/or how it is captured the second number of respective previous and subsequent values is defined.

Another embodiment provides an apparatus to operate an injection valve, wherein the injection valve comprises a valve needle preventing a fluid flow out of an injection nozzle in a closing position and enabling the fluid flow of the injection nozzle apart from the closing position, and an electro-magnetic actuator unit being designed to actuate the valve needle, wherein the apparatus is designed to activate the actuator unit according to a predetermined activation signal with a given activation period for effecting a fluid flow out of the injection nozzle, to capture an actuator unit voltage characteristic at least over a period of time during which the valve needle could reach the closing position, to determine a noise part of the captured actuator voltage characteristic, and to determine a closing time representing a time when the valve needle reaches the closing position depending on the noise part of the captured actuator voltage characteristic.

BRIEF DESCRIPTION OF THE DRAWINGS

Example embodiments of the invention are discussed below with reference to the figures, in which:

FIG. 3 is a diagram for evaluating a closing time.

DETAILED DESCRIPTION

Figure 1:
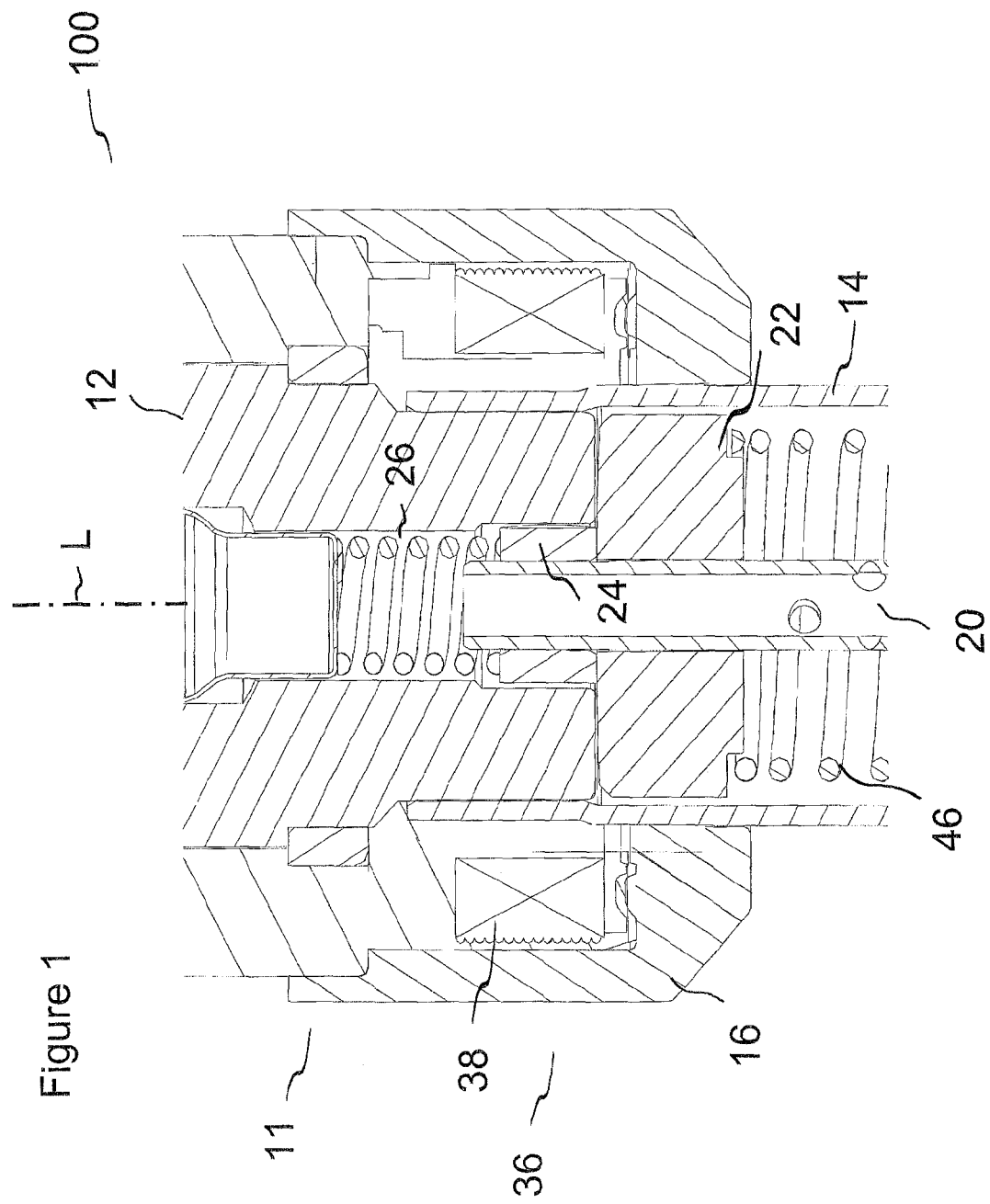
FIG. 1 shows an embodiment of an injection valve.

Some embodiments provide a method and an apparatus for operating an injection valve which contribute to a reliable and precise function of the injection valve.

For example, some embodiments provide a method and a corresponding apparatus to operate an injection valve. The injection valve comprises a valve needle preventing a fluid flow out of an injection nozzle in a closing position and enabling the fluid flow of the injection nozzle apart from the closing position. Furthermore the injection valve comprises an electro-magnetic actuator unit being designed to actuate the valve needle. The actuator unit is activated according to a predetermined activation signal with a given activation period for effecting a fluid flow out of the injection nozzle. An actuator unit voltage characteristic is captured at least over a period of time during which the valve needle could reach the closing position. A noise part of the actuator unit voltage characteristic is determined and a closing time representing a time when the valve needle reaches the closing position is determined depending on the noise part of the captured actuator voltage characteristic.

In this way it is possible to determine the time, the valve needle effectively reaches the closing position, very precisely. To control injection durations and quantities of the injection valve the actuator unit may be activated by a predetermined activation signal during a given activation period. Therefore the actuator unit may be controlled by a drive unit. The amount of injected fluid depends on the pulse or signal shape and the activation period of the activation signal. The activation period is a preferred parameter for controlling the amount and/or flow rate of injected fluid. The activation period characterizes a complete control time that could be divided in different phases according given requirements. But for a precise dosing of the fluid it is advantageous to know the time the valve needle effectively reaches the closing position. For instance, the injection valve is indeed calibrated when new to correlate the activation signal with the amount of fluid injected. But such calibrations are approximate because the amount of fluid injected varies with engine operating conditions and/or with age and/or wear of the injection valve. So, a closing period, representing a time period between an end of the activation period and the time the valve needle reaches the closing position, of a particular injector valve can vary, which can affect the estimation of the flow rate and/or the amount of fluid injected. A variation of the closing period for a particular injector valve becomes especially relevant, if the closing period becomes of the same order of the activation period. It may cause that an injection linearity is lost in case of a short activation period.

The electro-magnetic actuator unit comprises a coil and a core. For instance the core may be mainly formed by a pole piece which for instance is at least a part of an inlet tube. But there may be additional or other elements guiding and/or amplifying a magnetic field induced by the coil and therefore may be assigned to the core, like a housing and/or a valve body. The armature, the coil and the core of the actuator unit and, for instance, the other elements guiding and/or amplifying the magnetic field induced by the coil form an electro-magnetic circuit. An electrical behaviour of this electro-magnetic circuit can be characterized by an actuator unit voltage. For instance, the actuator unit voltage characteristic can be measured by a voltage sensor.

During activation the magnetic field induced by the coil is controlled by the activation signal. In this way the armature is directly controlled by the activation signal during the activation period. After the activation period, when the activation signal has returned to zero or another off state this force coupling is interrupted and there is a transient phase. During the transient phase the armature and other with the armature mechanically coupled components move themselves depending upon their inertia and/or a mechanic condition and/or a hydraulic condition to close the injector. The dynamic behaviour of the armature may depend on an architecture of the injection valve. A change of a dynamic behaviour of the armature, e.g. because the needle reaches a seat, causes the actuator unit voltage comprising high frequency signal parts. The noise part of the actuator unit voltage comprises at least this high frequency signal parts. The noise part may additionally comprise other system related noise and/or noise from external sources.

According to one embodiment a smoothed actuator unit voltage characteristic is determined by at least filtering the actuator unit voltage characteristic once with a smoothing filter. The noise part is determined depending on the difference between the captured actuator unit voltage characteristic and the smoothed actuator unit voltage characteristic. In this way the noise part of the actuator unit voltage can be simply determined. It is possible to measure the actuator unit voltage by sampling the actuator unit voltage by given sampling instances.

According to a further embodiment the closing time is determined in correlation with a maximum of the noise part. For instance, a temporal characteristic of the noise part shows the maximum when the needle reaches the closing position.

According to a further embodiment the smoothing filter is designed to determine for a respective value of the captured actuator unit voltage characteristic or a pre-processed actuator unit voltage characteristic an average value or a weighted average value depending on the value itself and a given second number of respective previous and subsequent values. High frequency signal components, which may relate mainly to the high frequency signal parts of the actuator unit voltage caused by the change of the dynamic behaviour of the armature, can be sub-pressed by this averaging.

According to a further embodiment a first number of filter cycles is defined depending on the actuator unit voltage characteristic and/or how it is captured. This has the advantage that depending on a particular application the filtering procedure can be repeated several times, for instance, until the high frequency signal components nearly disappear. For instance, it is possible to filter the actuator unit voltage and to filter the resulting pre-processed actuator unit voltage again.

According to a further embodiment the second number of respective previous and subsequent values is defined depending on the captured actuator unit voltage characteristic and/or how it is captured. In this way an additional parameter is available for optimizing the filtering procedure according to predefined requirements.

An injection valve 100 (FIG. 1), that is particular suitable for dosing fuel into an internal combustion engine, comprises e.g. a valve assembly 11 and an inlet tube 12.

The valve assembly 11 comprises a valve body 14 with a central longitudinal axis L and a housing 16. The housing 16 is partially arranged around the valve body 14. Furthermore a cavity 18 is arranged in the valve body 14.

The cavity 18 takes in a valve needle 20, an armature 22 and in this particular case a damper element, e.g. a damper spring 46. The damper spring 46 forms a soft stop element for the armature 22. In the shown embodiment the armature 22 has an upper guide 24 formed as a circular tube section around the valve needle 20. The upper guide 24 is mechanically coupled with the valve needle 20.

A calibration spring 28 is arranged in a recess 26 provided in the inlet tube 12.

The valve needle 20 comprises, for example, a valve needle body and a sealing element. The sealing element is mechanically coupled with the valve needle body. The valve needle body preferably has a cylindrical shape. The sealing element has for example a spherical shape. Alternatively, the sealing element can have a conical shape. In a closing position of the valve needle 20, the sealing element rests on a seat preventing a fluid flow through at least one injection nozzle of the injection valve 100. The injection nozzle may be, for example, an injection hole. However, it may also be of some other type suitable for dosing fluid. The sealing element permits the fluid injection into the combustion chamber in further positions, i.e. when it does not rest on the seat. The further positions represent non-closing positions.

The valve assembly 11 is provided with an actuator unit 36 which is preferably an electro-magnetic actuator. The actuator unit 36 comprises, for example, an armature 22, a core and a coil 38, which is preferably arranged inside the housing 16 and overmolded. The coil 38 and the core form an electromagnet. In this embodiment the core is mainly formed by a pole piece, which is for instance a part of the inlet tube 12. But also the housing 16 and the valve body 14 are affected by a magnetic field induced by the activated coil 38 and therefore may be assigned to the core. There may be other and/or additional elements guiding and/or amplifying the magnetic field induced by the coil 38.

The actuator unit 36 and the other elements guiding and/or amplifying the magnetic field induced by the coil 38 form an electro-magnetic circuit. An electrical behaviour of this electro-magnetic circuit can be characterized by an actuator unit voltage. For instance, the actuator unit voltage can be measured by a voltage sensor. There might be additional and/or other components which are affected by the magnetic flux and therefore may be considered in the electro-magnetic circuit.

In the case when the electro-magnetic actuator unit 36 with the coil 38 is activated by a predefined activation signal during a given activation period Ti, the electromagnet may effect, depending on the activation signal, an electro-magnetic force on the armature 22. The armature 22 may be attracted by the electromagnet and moves in the direction of the longitudinal axis L away from a fluid outlet. The armature 22 pushes on the upper guide 24, which is mechanically coupled with the valve needle 20 and therefore the valve needle 20 moves in axial direction out of the closing position.

After the activation period Ti, when the activation signal has returned to zero or another off state this force coupling is interrupted and there is a transient phase T_phase because some energy is still stored in the electro-magnetic circuit. Depending on a force balance between the force on armature 22 caused by the electromagnet and the force on the armature 22 caused by the calibration spring 28 the valve needle 20 moves in its closing position. The motion of the armature 22 has an impact on the electrical behaviour of the electro-magnetic circuit and therefore on the actuator unit voltage during the transient phase T_phase. Depending on an architecture of the injection valve 100 the armature 22 has a different dynamic behaviour and so a different impact on the actuator unit voltage.

A change of a dynamic behaviour of the armature 22, e.g. because the needle reaches the seat, causes the actuator unit voltage comprising high frequency signal parts. The noise part of the actuator unit voltage comprises at least this high frequency signal parts. The noise part may additionally comprise other system related noise and/or noise from external sources.

Figure 2:
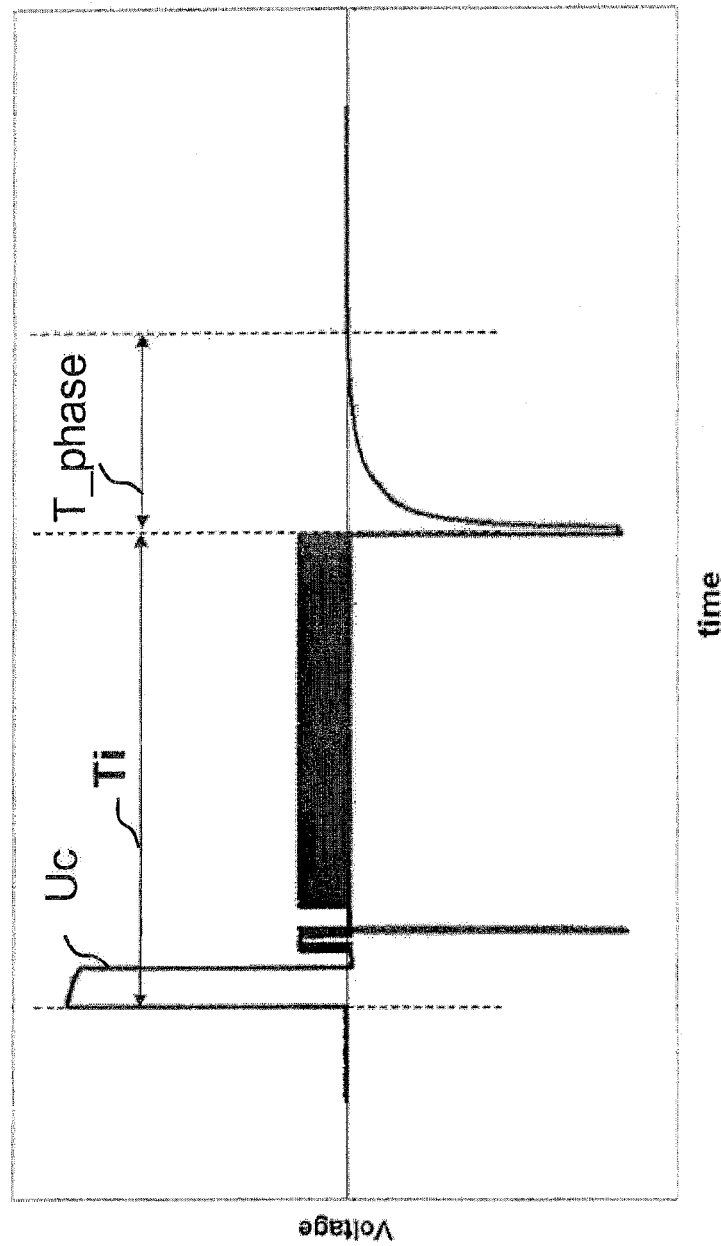
FIG. 2 is a diagram of an actuator unit voltage characteristic.

FIG. 2 shows a diagram of an actuator unit voltage characteristic Uc during the activation period Ti and the transient phase T_phase. In this case possible pre-charge phases are not included. The actuator unit 36 is activated according to a predetermined activation signal with a given activation period Ti for effecting a fluid flow out of the injection nozzle. The actuator unit 36, for instance, comprises actuator unit control pins. The activation signal may be applied to these control pins. The actuator unit voltage can, e.g., be measured on these control pins by sampling the actuator unit voltage with given sampling instances.

A variation of the armature dynamic, which happens in a moment the valve needle 20 reaches the closing position, can be detected depending on a the actuator unit voltage characteristic Uc. The actuator unit voltage characteristic Uc is captured at least over a period of time during the valve needle 20 could reach the closing position. For instance, the actuator unit voltage may be captured during the activation period Ti and the transient phase T_phase. Alternatively it is also possible that actuator unit voltage may be captured only during the transient phase T_phase.

For instance, a smoothed actuator unit voltage characteristic Us is determined by filtering the actuator unit voltage characteristic Uc once with a smoothing filter and the noise part is determined depending on the difference between the captured actuator unit voltage characteristic Uc and the smoothed actuator unit voltage characteristic Us.

The smoothing filter may be a linear smoothing filter, wherein the smoothing filter is designed to determine for a respective value of the captured actuator unit voltage characteristic or a pre-processed actuator unit voltage characteristic an average value depending on the value itself and a given second number of respective previous and subsequent values according equation 1:

$$s_i^j = \frac{\sum_{k=i-N}^{i+N} s_{i+k}^{j-1}}{2N+1} \qquad \text{Eq. 1}$$

i: sample time index
j: number of current filter cycle (j=1 ... M)
N: number of previous samples and number of subsequent samples, i. e. average radius A filter procedure, for instance according equation 1, may be applied several times until the high frequency signal components nearly disappear.

Alternatively the smoothing filter may be a linear smoothing filter which is designed to determine for a respective value of the captured actuator unit voltage characteristic or a pre-processed actuator unit voltage characteristic a weighted average value depending on the value itself and a given second number of respective previous and subsequent values. Also a non-linear smoothing filter may be applied. In the case the filter procedure is performed several times, also different smoothing filter types may be used.

With respect to the time line the diagram of FIG. 3 show a part of the transient phase T_phase. The valve needle 20 reaching the closing position by contacting the seat causes a change in the dynamic behaviour of the armature 22.

For instance, a temporal characteristic of the noise part shows a maximum when the needle reaches the closing position. So, the closing time t_close may be determined in correlation with the maximum of the noise part.

What is claimed is:

1. A method to operate an injection valve including a valve needle preventing a fluid flow out of an injection nozzle in a closing position of the valve needle and enabling the fluid flow of the injection nozzle in other positions of the valve needle, and an electro-magnetic actuator unit being designed to actuate the valve needle, the method comprising:
   activating, by a drive unit, the electro-magnetic actuator unit according to a predetermined activation signal supplied by the drive unit with a given activation period for effecting a fluid flow out of the injection nozzle,
   capturing, by a voltage sensor, a detected actuator unit voltage characteristic at least over a period of time during which the valve needle could reach the closing position,
   calculating, by a processor, a smoothed actuator unit voltage characteristic by filtering the actuator unit voltage characteristic with a smoothing filter at least once,
   determining, by the processor, a noise signal defined by a difference between the detected actuator unit voltage characteristic and the smoothed actuator unit voltage characteristic,
   determining, by the processor, a temporal maximum noise signal, and
   determining, by the processor, a closing time representing a time when the valve needle reaches the closing position, based on the determined temporal maximum of the noise signal.

2. The method of claim 1, comprising defining a number of filter cycles based on at least one of the actuator unit voltage characteristic and how the actuator unit voltage characteristic is captured.

3. The method of claim 1, comprising defining a number of respective previous and subsequent values based on at least one of the captured actuator unit voltage characteristic and how the actuator unit voltage characteristic is captured.

4. The method of claim 1, comprising using a smoothing filter to determine, for a respective value of the captured actuator unit voltage characteristic or a pre-processed actuator unit voltage characteristic, an average value or a weighted average value based on the value itself and a given number of previous and subsequent values.

5. The method of claim 1, wherein the step of capturing, by the voltage sensor, the detected actuator unit voltage characteristic at least over the period of time during which the valve needle could reach the closing position comprises capturing the detected actuator unit voltage characteristic during a period including a transient period subsequent to the activation period.

6. The method of claim 1, wherein the step of capturing, by the voltage sensor, the detected actuator unit voltage characteristic at least over the period of time during which the valve needle could reach the closing position comprises capturing the detected actuator unit voltage characteristic during a period including at least a portion of the activation period and a transient period subsequent to the activation period.

7. An apparatus for operating an injection valve comprising a valve needle preventing a fluid flow out of an injection nozzle in a closing position and enabling the fluid flow of the injection nozzle apart from the closing position, and an electro-magnetic actuator unit being designed to actuate the valve needle, wherein the apparatus is configured to:
activate the actuator unit according to a predetermined activation signal with a given activation period for effecting a fluid flow out of the injection nozzle,
capture a detected actuator unit voltage characteristic at least over a period of time during which the valve needle could reach the closing position,
calculate a smoothed actuator unit voltage characteristic by filtering the actuator unit voltage characteristic with a smoothing filter at least once,
determine a noise signal defined by a difference between the detected actuator unit voltage characteristic and the smoothed actuator unit voltage characteristic,
determine a temporal maximum of the noise signal, and
determine a closing time representing a time when the valve needle reaches the closing position depending on the determined temporal maximum of the noise signal.

8. The apparatus of claim 7, wherein the apparatus is configured to define a number of filter cycles based on at least one of the actuator unit voltage characteristic and how the actuator unit voltage characteristic is captured.

9. The apparatus of claim 7, wherein the apparatus is configured to define a number of respective previous and subsequent values based on at least one of the captured actuator unit voltage characteristic and how the actuator unit voltage characteristic is captured.

10. The apparatus of claim 7, comprising a smoothing filter is configured to determine, for a respective value of the captured actuator unit voltage characteristic or a pre-processed actuator unit voltage characteristic, an average value or a weighted average value based on the value itself and a given number of previous and subsequent values.

11. The apparatus of claim 7, wherein capturing the detected actuator unit voltage characteristic at least over the period of time during which the valve needle could reach the closing position comprises capturing the detected actuator unit voltage characteristic during a period including a transient period subsequent to the activation period.

12. The apparatus of claim 7, wherein capturing the detected actuator unit voltage characteristic at least over the period of time during which the valve needle could reach the closing position comprises capturing the detected actuator unit voltage characteristic during a period including at least a portion of the activation period and a transient period subsequent to the activation period.

* * * * *